United States Patent

[11] 3,590,411

| [72] | Inventor | John C. Zemlin |
| | | Reading, Pa. |
| [21] | Appl. No. | 787,175 |
| [22] | Filed | Dec. 26, 1968 |
| [45] | Patented | July 6, 1971 |
| [73] | Assignee | USM Corporation |
| | | Boston, Mass. |

[54] STIFFENING PROCESSES
9 Claims, 6 Drawing Figs.

[52] U.S. Cl. .................................... 12/146 D, 161/190
[51] Int. Cl. ........................................ A43d 00/00
[50] Field of Search.......................... 12/146 D; 161/190

[56] References Cited
UNITED STATES PATENTS

| 3,239,861 | 3/1966 | Langlais | 12/146 (D) |
| 3,316,573 | 5/1967 | Chaplick et al. | 12/146 (D) |

*Primary Examiner*—Patrick D. Lawson
*Attorneys*—W. Bigelow Hall, Richard A. Wise and Benjamin C. Pollard

ABSTRACT: Stiffening process for sheet material particularly for parts of shoe uppers. In the stiffening process, liquid reagents are mixed and formed into a pliable plastic stiffener layer at an intermediate stage of cure. With the stiffener layer disposed against the material to be stiffened, the assembly is shaped and heated to soften the plastic and establish adhesion between the plastic stiffener layer and the sheet material and the plastic is thereafter cured to heat resistant, shape-retaining condition.

PATENTED JUL 6 1971  3,590,411
SHEET 1 OF 2
Fig. 1
Fig. 2
Fig. 3
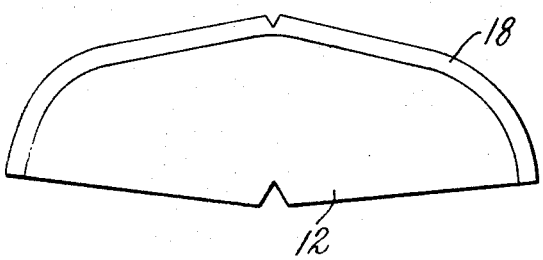
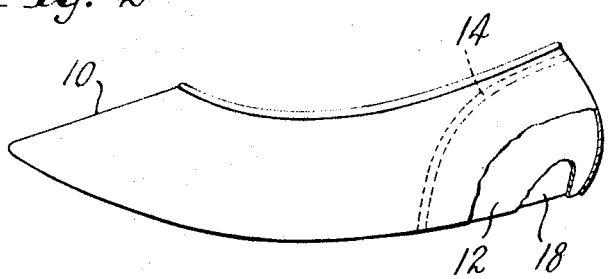
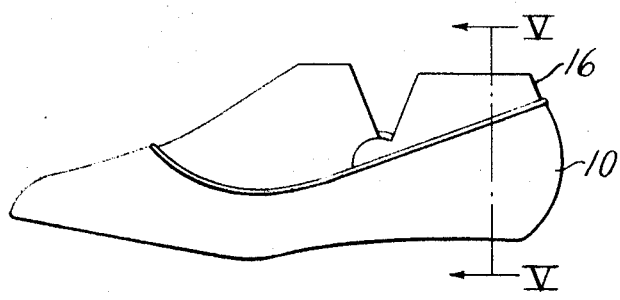
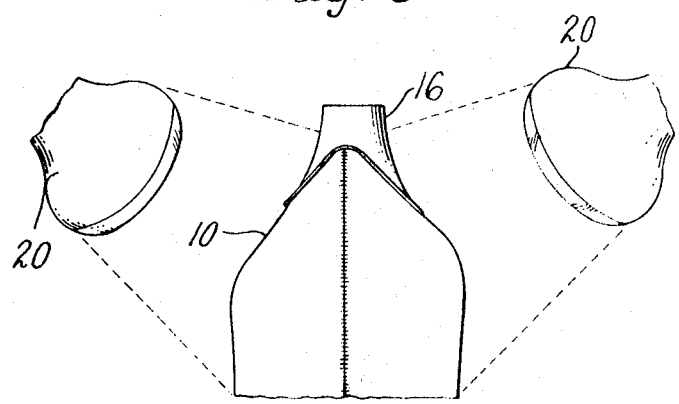
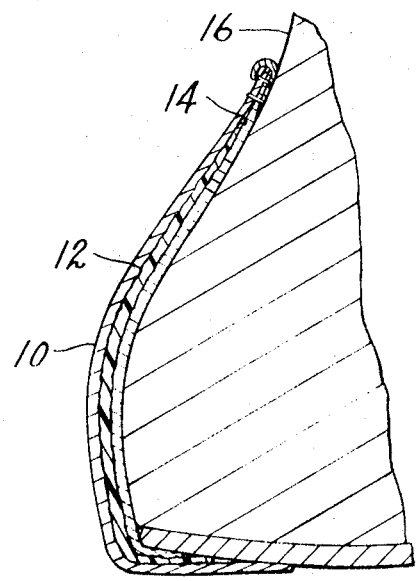
Fig. 4
Fig. 5
Inventor
John C. Zemlin
By his Attorney
Benjamin C. Pollard

STIFFENING PROCESSES

BACKGROUND OF THE INVENTION

In the stiffening of shoe uppers, particularly the toe and heel ends, moldable sheet materials which are softened by heat or solvent are incorporated into shoe uppers prior to lasting, shaped in the course of lasting and allowed to harden to shape-retaining state before removal of the shoe upper from the last. The problem of inserting and properly locating a stiffener sheet material in the limp sticky condition characteristic of stiffeners so softened, introduces difficulties and delays into the shoemaking process, and the resulting stiffener is subject to deformation under continued applied stresses as in wearing of a shoe as well as being subject to distortion when heated, as, for example, in a store window.

It has also been proposed to employ stiffener sheet materials carrying thermosetting phenol aldehyde or urea aldehyde resin compositions in uncured state, to apply a curing agent to a surface of the stiffener and to allow the stiffener to cure and harden after having been incorporated in a shoe and lasted to bring it to the desired shape. Such stiffeners have required an unacceptably long time for completion of cure and also have been brittle so that the stiffeners cracked and lost their ability to retain shape in use.

SUMMARY OF THE INVENTION

It is an object of the present invention to provide a stiffening process particularly for shoes in which a pliable sheet or layer of stiffener material is disposed against a member to be stiffened and is caused to conform and adhere to the member and is converted to a cured, heat-resistant, tough, resilient condition.

To this end and in accordance with a feature of the invention I have provided a stiffening process in which liquid reagents are mixed and reacted to form a sheet of layer of curable plastic stiffener material at an intermediate stage of cure in which it is in a pliable, solid, substantially nontacky state and the stiffener material is disposed adjacent a surface, e.g., a part of a shoe upper to be stiffened. The sheet and stiffener material are subjected to a mild heating to convert at least the surface portions of the stiffener material to softened adhesive or flowable condition and the sheet to be stiffened is pressed against the stiffener material. Where the sheet material is part of a shoe upper, pressure may be applied by lasting the shoe upper so that the stiffener material is pressed into wetting adhesive engagement with the surfaces of the part to be stiffened. Thereafter the stiffener is cured to heat-resistant, stiffly resilient condition while maintaining the article to be stiffened, e.g. the shoe part, in the desired shape.

PREFERRED EMBODIMENTS

The invention will be described in connection with the attached drawings forming part of the disclosure in the present case in which:

FIG. 1 is a plan view of a counter stiffener blank of curable plastic material;

FIG. 2 is a side elevational view with parts broken away of a shoe upper with the stiffener blank in place;

FIG. 3 is an end elevational view of the shoe upper of FIG. 2 mounted on a last for radiant heating;

FIG. 4 is a side elevational view of the shoe upper on a last after lasting;

FIG. 5 is a sectional view on an enlarged scale taken on line V-V of FIG. 4 and showing the relation between the stiffener and the layers of shoe material.

Figure 6:
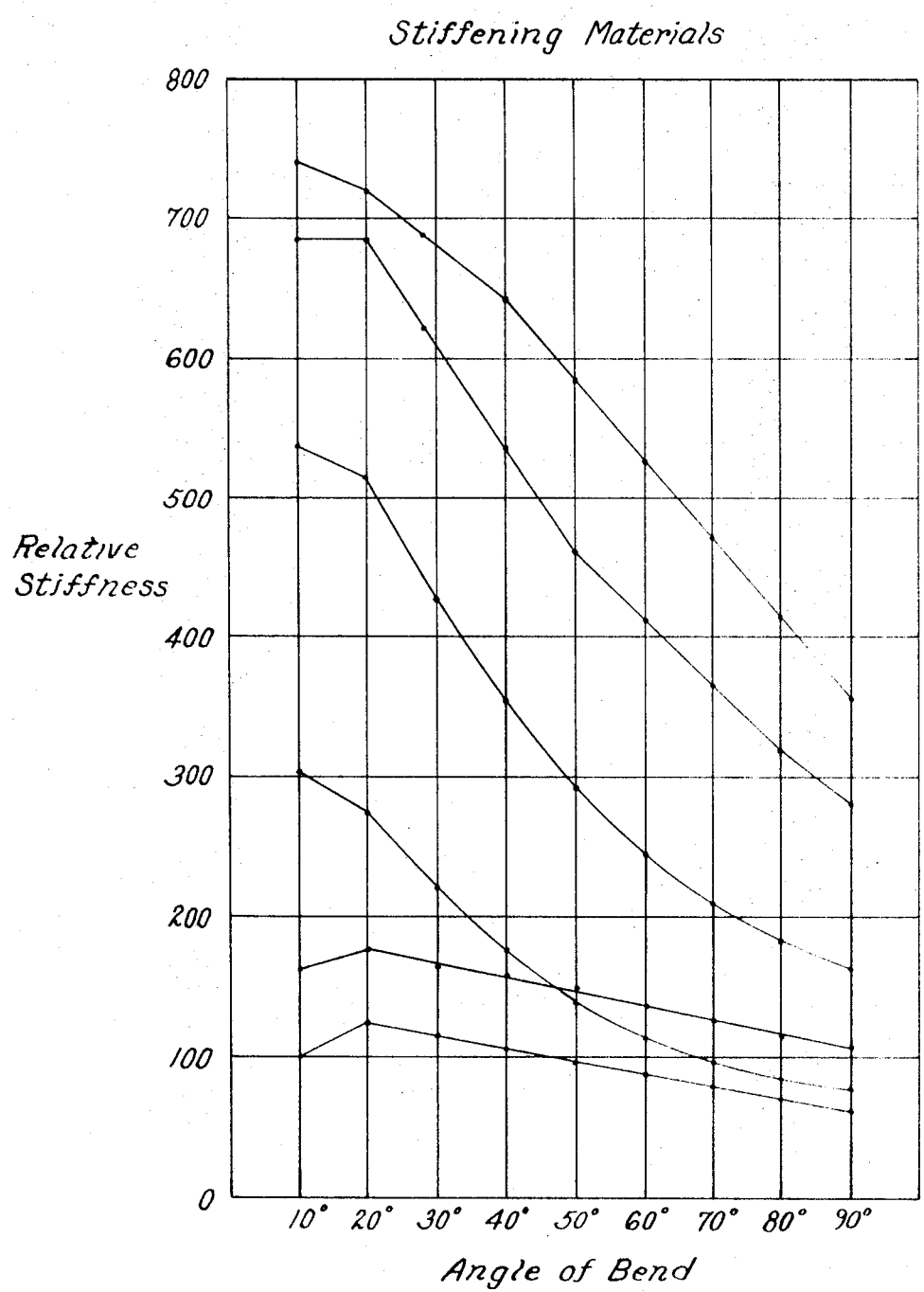
FIG. 6 is a series of curves showing relative stiffnesses of the stiffener material of the present invention compared to commercially available stiffening materials.

The stiffening process of the present invention is useful in many relationships including the stiffening of fabrics in clothing, instrument cases and the like. However, the material and process are specially valuable in stiffening parts of shoe uppers such as counters, toes, eyelet strips and other shoe parts and the following description will refer to this use.

In the process of the present invention liquid reagents are mixed, cast or molded, reacted and incorporated into a shoe upper 10 as a pliable layer 12 (see FIGS. 1 and 2) of partially reacted polymeric material. At this stage the material has sufficient body that a separately cast or molded layer of the material may be readily grasped and inserted as a layer in the counter pocket 14 or other area of a shoe upper 10 to be stiffened. As discussed below, this pliable handleable state is a characteristic of the linear polymeric condition and relatively low molecular weight of the material at the intermediate stage of polymerization of the components reactive to form the stiffener.

With the layer 12 in place, the shoe upper is placed on a last 16 (see FIG. 3) or other form and subjected to a mild heating which improves the conformability of the shoe upper 10 and layer 12 of stiffener material, and softens at least the surface of the layer 12 of stiffener material to a flowable condition in which it will wet and adhere to the shoe upper 10 and conform to irregularities of the shoe materials when subjected to shaping pressure as in lasting. The behavior of the stiffener material under this mild heating is a special advantage of the present stiffening process since the relatively low molecular weight of the stiffener material at this stage allows it to soften or melt at much lower temperatures and to wet surfaces and flow more freely than materials of the high molecular weights required in a final stiffening layer.

The shoe upper 10 is then lasted or otherwise shaped (see FIG. 4) and the shoe may be completed and removed from the last 16 or other form. The stiffener material will have increased in stiffness due to the further polymerization caused by the mild heating step and polymerization of the stiffener to its ultimate strong, tough, resilient condition will continue even at room temperature. However, it is preferred that the shoe upper and stiffener be given a further heating after the shaping step with the last 16 or other form still in place.

The first step in preparing the stiffener sheet or layer 12 according to the process of the present invention is forming an initially liquid mixture of components reactive to form a curable plastic such as a polyurethane. For forming a polyurethane plastic, one component may include normally liquid or readily liquefiable —NCO terminated prepolymer, preferably with admixed organic polyisocyanate; and the other component may include a normally liquid or readily liquefiable composition hereinafter referred to as "chain extender" providing a plurality of active hydrogen groups for reaction with the —NCO groups of the prepolymer. In the initial stages of the reaction, the component providing —NCO groups and the component supplying active hydrogen condense and polymerize to form relatively short chains with only limited cross linking so that a pliable, nontacky, solid intermediate reaction product is obtained. Ordinarily the initially liquid mixture of materials will be spread before such solidification as a layer thin enough for incorporation in a portion of a shoe to be stiffened but thick enough to provide the necessary stiffness when cured, so that the intermediate product solidifies as a layer or sheet. Sheets of the solidified material may be cut into stiffener blanks of the desired shape for assembly against a member to be stiffened. In a preferred form, the liquid mixture may be formed in a mold giving the desired thickness and outline and having tapered marginal portions 18.

A suitable —NCO terminated prepolymer may be made by mixing and reacting an organic compound providing a plurality of active hydrogens with an organic compound having a plurality of —NCO groups. Any of the commercial diisocyanates and diisocyanate mixtures may be used including those which contain minor amounts of triisocyanates but it is preferred to use the liquid diisocyanates such as tolylene diisocyanate, methylene bis(4-phenyl isocyanate) in liquid form, 2,6 dimethyl diisocyanato methylcaproate and other liquid or readily liquefiable diisocyanates.

Difunctional active hydrogen compounds may be reacted with the organic isocyanate. However, for superior stiffness, toughness and heat-resistance in the final product it has been found preferable to include a substantial proportion which may be from 15 percent up to 100 percent of the active hydrogen compound of trifunctional active hydrogen compound, the percentage being percentage of equivalents of active hydrogen. Suitable trifunctional compounds include trimethylolpropane, glycerine, polypropylene glycol ether triols, 1,2,6 hexane triol and other triols. Useful difunctional active hydrogen compounds include polypropylene ether glycols, polytetramethylene ether glycols, ethylene oxide and propylene oxide adducts of difunctional aromatic phenols. The isocyanate material and the active hydrogen material are combined in a ratio to provide at least about two equivalents of —NCO for each equivalent of active hydrogen. Useful prepolymers may be prepared from reagents providing ratios of —NCO to —OH in the range of from 2:1 to 9:2.

To form a pliable intermediate reaction stage material adapted for shaping and bonding with sheet material, it appears important that the active hydrogen compounds be selected and proportioned so that the prepolymer formed by reaction with the —NCO compound will have an equivalent weight of less than about 500. This may be achieved by using a mixture of high molecular weight active hydrogen material such as one of the polypropylene glycol ether triols with low molecular weight material such as trimethylolpropane.

An additional proportion of a preferably liquid organic polyisocyanate such as tolylene diisocyanate or polyarylene polyisocyanate (PAPI) is ordinarily included along with the prepolymer at the time of mixing with the chain extender. The additional isocyanate is useful in reducing the viscosity to aid in mixing. The mixture of prepolymer and free polyisocyanate will be used in quantity to provide about a 10 percent excess of —NCO. That is, a quantity of the mixture will be used sufficient to provide about 1.1 equivalents of —NCO for each equivalent of active hydrogen in the chain extender. Also in a mixture providing the 1.1 equivalents of —NCO it has been found desirable to employ prepolymer in amount providing about 0.9 to 0.2 equivalents of —NCO and organic polyisocyanate in amount providing from 0.2 to 0.9 equivalents of —NCO. The excess of —NCO over the stoichiometric amount provides additional cross linking in the final product with resultant increase in heat resistance and shape retaining ability.

The material i.e. the "chain extender" for combination with the mixture of the —NCO terminated prepolymer and additional polyisocyanate, must have at least two active hydrogens per molecule. Useful chain extenders include for instance, polyols, polyamines and compounds containing both amine groups and hydroxyl groups. A mixture of diamines and polyols seems helpful in preventing brittleness in the final product presumably because the mixture gives a reaction product having less tendency to crystallize. Also it appears important in forming a pliable intermediate polymeric material that the chain extender mixture include from about 5 mol. percent to about 50 mol. percent and preferably from about 10 mol. percent to about 30 mol. percent of an aromatic diamine such as methylene bis-orthochloroaniline, 3,3' dichlorobenzidine and orthoanisedine which will react with the polyisocyanate at a rate comparable to the reaction rate of the polyol material. That is, a too rapid amine reaction may build up excess urea groups which become insoluble in the mixture and may develop a gel structure. The balance to 100 mol. percent of the chain extender mixture may be a polyol such as condensates of methylene bis-phenol with ethylene oxide or propylene oxide, or short chain polyester polyols such as di- or trifunctional condensation products of $\epsilon$-caprolactone with a low molecular weight diol such as ethylene glycol or propylene glycol, or a low molecular weight triol such as trimethylolpropane, glycerine and so on.

An important factor in the reaction of the components to form successive batches of intermediate stage product which are uniform in properties from batch to batch, is the balancing of amine and polyol proportions in the chain extender component. Although the more slowly reacting of the amines are used, the reaction rate even of these amines is greater than the reaction rate of the polyols.

It is believed that the intermediate stage product is in the state in which essentially all of the amine has reacted with isocyanate while the polyol reaction with isocyanate is not yet complete. Since further reaction to complete combination of the polyol with the isocyanate to form the final stiff resilient product is relatively slow, even with preferred catalysts such as soluble lead salt catalysts, and with use of controlled temperatures, the change in properties of a reaction mix after the amine has been reacted is relatively slow. Accordingly, there is considerable leeway as to the time of stopping or slowing down the reaction within which a product of the desired properties, i.e. pliability, transitory melting point, etc. will be obtained. Also, the product will retain these properties for a substantial period of time for convenience in manufacturing use, e.g. up to 24 hours and more until heated to complete the reaction and cure the material to tough, stiffly resilient condition.

The above discussion is given to aid in understanding the invention; but, it is to be understood, the invention is not dependent on the accuracy of the explanation since combining the materials as disclosed gives new and useful results.

One or both of the components, i.e. prepolymer and chain extender to be mixed and reacted may include antioxidants and ultraviolet absorbers for their usual purposes. Also low cost fillers such as clays or silica may be included to reduce the cost of the composition.

It has also been found that addition of short fine fibers gives a substantial improvement in stiffness of the cured stiffener and reduces tendencies toward brittleness of the intermediate stage material. Useful results have been obtained with addition of from 1 percent to 15 percent by weight of fibers such as one-eighth inch long glass fibers or one-sixteenth inch long rayon fibers based on the weight of the reactive components.

The prepolymer, chain extender and, preferably also, free polyisocyanate are mixed in a suitable high speed mixer, and the mixture while still liquid is formed into a layer of suitable thickness. The layer may be formed either on the sheet material to be stiffened or, more usually, may be formed as a separate layer on a release surface or in a mold for subsequent combination with a material to be stiffened. In a preferred form, the material may be shaped, for example, in a mold or otherwise brought to the desired thickness, outline shape and contour while still fluid. An essentially linear polymer of relatively low molecular weight, ordinarily less than about 10,000 is formed in a very short time. The time required to reach the stage, is, of course, dependent on temperature, and limited heat may be used to speed up the reaction. For example, by heating to 220° F., the development of the low molecular weight polymer state may be reached in less than 2 minutes. This low molecular weight polymer material is a pliable solid capable of being shaped and capable of being handled, for example, to strip it from a release surface or mold and to incorporate it with sheet material to be stiffened. At this stage, the polymer is fusible on heating although the softened or molten condition is only temporary since the curing of the polymer material will render it infusible. This characteristic is described as having a transitory melting or softening point, and it is desirable that the transitory melting point be about 100° F. to 250° F. Heating will cause further polymerization of the polymer to a tough, infusible cross-linked, high molecular weight polyurethane material.

Stiffener blanks 12 of the pliable material may be incorporated in shoe uppers 10 by the usual shoemaking methods. For counter stiffening, this usually involves inserting a counter stiffener blank 12 in a counter pocket 14 in the shoe upper 10. The shoe upper may then be placed on a last 16 or other form and subjected to radiant heat from lamps 20 or other radiant heat source for a brief period before being shaped or lasted.

Radiant heating for from about 30 to 60 seconds has been found to cause heat to penetrate the shoe upper material and to heat at least the surface portions of the stiffener 12 to a temperature which may be about 100° C. at which the surface of the counter blank will flow under the pressure of lasting or shaping and will wet and adhere to adjacent portions of the shoe upper 10. As shown in FIG. 5, the surface flow and wetting behavior of the stiffener allow it to conform to irregularities in the upper and to form a superior union with the upper material. The shoe upper 10 is shaped as by lasting or backpart molding preferably while in heated condition and, on cooling, will have at least limited shape retaining ability in further handling. After other shoemaking operations are completed, the shoe is desirably subjected to a further heating step such as a heat setting operation where, for example, it may be kept at heat setting temperatures which may be from 180° to 300° F. for from 4 to 30 minutes. The heat setting operation may raise the temperature of the shoe up to about 212° F. at the higher heat setting temperatures and times. Cure of the polyurethane material to infusible cross linked condition will be substantially complete at the end of this heating step. Without the heating step, a substantial period of at least several hours may be required to allow suitable curing of the polyurethane material.

The fully cured stiffener has excellent shape retaining action in the shoe, with good resistance to heat and superior ability to withstand even extreme flexing without cracking or permanent distortion.

The following examples are given to aid in understanding the invention but it is to be understood that the invention is not restricted to the particular materials, proportions or procedures given in the Examples.

Example I

An —NCO terminated prepolymer was prepared by reaction of 22 parts by weight of polypropylene glycol ether triol having a molecular weight of about 4,000, 3 parts by weight of trimethylolpropane and 15 parts by weight of tolylene diisocyanate. The prepolymer was a viscous liquid at room temperature. 90 parts by weight of the prepolymer were combined with 13 parts by weight of tolylene diisocyanate, 63 parts by weight of an aromatic diol having an equivalent weight of 245, (Pluracol 245), from condensation of methylene bis phenol with propylene oxide, 8.5 parts by weight of methylene-bis-orthochloroaniline and 0.17 parts by weight of lead 2-ethylhexoate as catalyst and thoroughly mixed. The mixture was spread in a sheet about 0.050 inch in thickness and heated for about 1 minute to a temperature of about 105° C. The cast material was then cooled giving a solid, pliable, nontacky sheet.

A counter stiffener blank was cut from the sheet material and inserted in the counter portion of a shoe upper. The shoe upper was positioned on a last and the counter portion subjected to radiant heat for about 60 seconds. It was found that the surface portions of the stiffener sheet had reached a temperature of about 100° C. and was relatively soft enabling it to flow into wetting adhesive engagement when pressed against a shoe part. The shoe upper was lasted while the surface of the counter was hot and the shoe was then subjected to a conventional heat setting treatment.

The resulting counter was stiffly resilient and possessed excellent shape retention ability for use in shoes.

Example II

Twenty parts of the —NCO terminated prepolymer of Example I were combined with 16.74 parts by weight of tolylene diisocyanate, 43 parts by weight of an aromatic diol from condensation of methylene bis phenol with propylene oxide having an equivalent weight of 245, (Pluracol 245), 5.8 parts by weight of methylene-bis-orthochloroaniline and 0.84 parts by weight of lead 2-ethylhexoate. The material was mixed, cast and heated as before. The material solidified to a solid, pliable state and a counter stiffener blank was cut from the sheet, incorporated in a shoe upper, given a short radiant heating, lasted and heat set as in Example I.

The resultant shoe was much stiffer than the shoe stiffened in accordance with the material of Example I and corresponded in stiffness to a high density polyethylene counter.

Example III

Strips of the sheet materials of Examples I and II were cut and cured with heat treatments comparable to those employed in the examples; and the stiffnesses of the cured sheets were compared with the stiffnesses of strips of a high density and of a low density polyethylene counter stiffener material and also with commercial thermoplastic resin stiffeners. The thermoplastic resin stiffeners were tested as composites with fabrics to enable them to stand the test.

The relative stiffnesses of the materials were determined in accordance with ALCA Stiffness Testing Method on a Tinius Olsen Stiffness Tester using 1 inch wide strips and bending them through 90°. The results are shown in the curves in FIG. 6. In FIG. 6, curve A is the curve for the material of Example II, curve B is obtained from a high density polyethylene counter stiffener material, curve C is for a commercial hot melt stiffener applied to a fabric by a hot melt stiffener applying machine, curve D is a commercial stiffener in which fabric was precoated with resin for insertion between layers in a shoe, curve E is the stiffness curve for the stiffener material of Example I and curve F is the curve for the low density polyethylene stiffener material. It is to be observed that the polyurethane stiffener material of Examples II and I (curves A and E), and the polyethylene stiffener materials (curves B and F) showed a linear decrease in relative stiffness with increasing bend angle. This is a desirable behavior to provide stiffness within a shoe. The thermoplastic resin stiffener materials, curves C and D, deviated markedly from linearity in decrease in relative stiffness and developed an increasing number of permanent cracks as the bend increased. Without a fabric reinforcement or association with the fibrous sheet material, these thermoplastic materials would have broken in being bent.

It was found (see the following table) that the polyurethane materials exhibit recovery from a 90° bend in the stiffness tester approximating that of the polyethylene stiffeners. On the other hand the commercial thermoplastic stiffener materials showed unsatisfactory recovery from the bending.

TABLE 1
"Permanent" Set After 90° Bend in Tinius-Olsen Tester, Degrees

| Specimen: | Recovery time | | |
|---|---|---|---|
| | 1 min. | 24 hrs. | 3 wks. |
| Polyurethane stiffener of Example II | 24 | 10 | |
| High density polyethylene | 27 | [1] 15 | 11 |
| Commercial thermoplastic resin stiffener material applied as hot melt to fabric | 35 | [1] 35 | 35 |
| Commercial thermoplastic resin stiffener material as a pre-coated fabric | 39 | [1] 39 | |
| Polyurethane stiffener of Example I | 19 | 0 | |
| Low density polyethylene stiffener | 10 | 0 | |

[1] Estimated.

Example IV

An —NCO terminated prepolymer was prepared by reaction of 269 parts by weight of polypropylene glycol ether triol having a molecular weight of 4,000, 40.5 parts by weight of trimethylolpropane and 246 parts by weight of tolylene diisocyanate. The prepolymer was a liquid at room temperatures.

361.8 parts by weight of the prepolymer was mixed with 1.7 parts by weight of tolylene diisocyanate and 44.5 parts by weight of 2,6 dimethyl diisocyanato methylcaproate and the mixture was reacted with 317 parts by weight of an aromatic diol from condensation of methylene bisphenol with propylene oxide (equivalent weight 245) and 29 parts by weight of methylene-bis-orthochloroaniline and 0.75 parts by weight of lead octoate and thoroughly mixed. The mixture was spread in a sheet about 0.050 inch in thickness and heated for about 1 minute to a temperature of 105° C. The cast material was then cooled giving a solid, pliable, nontacky sheet.

A counter stiffener blank was cut from the sheet and incorporated into the shoe using the procedure of Example I.

On curing the material of the counter blank became stiffly resilient and possessed excellent shape retaining properties.

Example V

Two hundred and seventy-five parts by weight of the —NCO terminated prepolymer prepared as in Example I and 43.5 parts by weight of tolylene diisocyanate were mixed and the mixture was combined with 107 parts by weight of an aromatic diol from condensation of methylene bisphenol with propylene oxide (equivalent weight 268), 49.6 parts by weight of a propylene oxide adduct of methylene bis phenol having an equivalent weight of 124 and 26.7 parts by weight of methylene-bis-orthochloroaniline and 0.47 parts by weight of lead octoate were added as catalyst. The mixture was spread as a 0.050 inch thickness sheet and heated for 15 seconds to 105° C. The sheet was then cooled to form a solid pliable sheet somewhat stiffer than that of Example I.

The sheet material cured to a very stiff resilient sheet on heating for 15 minutes at 100° C.

Example VI

An —NCO terminated prepolymer was prepared by adding 1652 parts by weight of a polypropylene glycol ether triol having a molecular weight of 6,000 and 158 parts by weight of trimethylolpropane with 1190 parts by weight of tolylene diisocyanate. The prepolymer was liquid at room temperature. One hundred and forty-five parts by weight of the prepolymer were then mixed with 97 parts by weight of an aromatic diol from condensation of methylene bisphenol with propylene oxide (equivalent weight 245), 12 parts by weight of methylene-bis-orthochloroaniline and 0.25 parts by weight of lead octoate. The material was promptly spread as a thin sheet and heated for 15 seconds at 120° C. On cooling to room temperature, the sheet was soft and pliable. A counter stiffener blank cut from the sheet material, inserted in the counter portion of a shoe upper and subjected to steps of Example I was somewhat softer than that of Example I.

Example VII

One hundred and eighty-seven parts by weight of the prepolymer prepared according to Example I were mixed with 60.9 parts by weight of tolylene diisocyanate to form a part A.

A part B was prepared by mixing 123 parts by weight of a triol from condensation of ε-caprolactone and trimethylolpropane having an equivalent weight of 176, 26.8 parts by weight of an aromatic diol having an equivalent weight of 245 from condensation of methylene bis phenol with propylene oxide, 26.7 parts by weight of methylene-bis-orthochloroaniline, 3.5 parts by weight of an antioxidant and 0.35 parts by weight of lead octoate.

The "Part A" was mixed and blended with the "Part B" and spread as a sheet about 0.050 inch in thickness and heated at 100° C. for 15 seconds to form an only slightly tacky pliable sheet. A counter stiffener blank cut from the sheet material and inserted in the counter portion of a shoe is curable to stiff, tough, resilient state in only 20 minutes at 100°

Example VIII

An —NCO prepolymer was prepared by reaction of 83.5 parts by weight of tolylene diisocyanate with 113 parts by weight of a propylene glycol ether triol having an average molecular weight of 710 and an equivalent weight of 237 from condensation of 1,2,6 hexane triol with propylene oxide.

The above prepolymer was mixed with 56.2 parts by weight of tolylene diisocyanate to form a liquid "Part A."

A "Part B" was formed by mixing 214.5 parts by weight of an aromatic diol having an equivalent weight of 245 from condensation of methylene bisphenol with propylene oxide, 26.7 parts by weight of methylene-bis-orthochloroaniline, 4.73 parts by weight of an antioxidant and 0.47 parts by weight of lead octoate.

The Part A" and "Part B" were mixed and spread out as a thin layer, 0.050 inch in thickness, and heated for 15 seconds to 100° C. The resulting sheet was immediately cooled with air to give a solid material. This material was curable by heating for 15 minutes at 100° C. to give an extremely stiff sheet material.

Example IX

One hundred eighty-seven parts by weight of an —NCO terminated prepolymer prepared as in Example I and 60.9 parts by weight of tolylene diisocyanate were mixed and the mixture was combined with a second mixture containing 214 parts by weight of an aromatic diol having an equivalent weight of 245 from condensation of methylene bisphenol with propylene oxide, 25.3 parts by weight of 3,3' dichlorobenzidine, 4.79 parts by weight of antioxidant and 0.48 parts by weight of lead octoate. The mixture was spread in a sheet about 0.050 inch in thickness and heated for 15 seconds at 100° C. The sheet was then quickly cooled to form a solid, nontacky, hard material. A counter stiffener blank cut from the sheet material, inserted in the counter portion of a shoe upper and heated to bring a least its surface temperature to 100° C. became relatively soft enabling it to flow into wetting adhesive engagement when pressed against a shoe part.

On further heating in a conventional heat setting treatment, the counter became hard, stiff and nonbrittle having excellent shape retention ability.

Example X

One hundred eighty-seven parts by weight of an —NCO terminated prepolymer prepared as in Example I and 60.9 parts by weight of tolylene diisocyanate were mixed and the mixture was combined with a second mixture containing 214 parts by weight of an aromatic diol having an equivalent weight of 245 from condensation of methylene bis-phenol with propylene oxide, 24.4 parts by weight of orthodianisidine, 4.79 parts by weight of an antioxidant and 0.48 parts by weight of lead octoate. The mixture was spread in a sheet about 0.050 inch in thickness and heated for 10 seconds at 100° C. The sheet was then quickly cooled to form a solid, nontacky, hard material. A counter stiffener blank cut from the sheet material, inserted in the counter portion of a shoe upper and heated to bring at least its surface temperature to 100° C. became relatively soft enabling it to flow into wetting adhesive engagement when pressed against a shoe part.

On further heating at conventional heat setting temperatures, the counter became hard, stiff and nonbrittle having excellent sheet retention ability.

Having thus described my invention what I claim as new and desire to secure by Letters Patent of the United States is:

1. The process for stiffening a flexible sheet material to hold it in a desired configuration comprising the steps of disposing resinous material as a thin, pliable layer in engagement with said sheet material, heating and shaping the flexible sheet and resinous layer, said resinous material comprising the curable, normally solid, substantially nontacky polyurethane from incomplete polymerization of mutually reactive materials including at least one organic compound having at least two —NCO groups and at least one organic compound having at least two active hydrogens, said resinous material having, at temperatures to which said flexible sheet may be exposed without harm, a transitory softening point in which the resinous material is softened to an adhesive state capable of bonding to an adjacent surface of the flexible sheet material and said heating being at least sufficient to bring surface portions of said layer to said adhesive state, and completing the cure of said polyurethane material to stiffly resilient, substantially infusible state while said sheet material is maintained in said desired shape.

2. The process as defined in claim 1 in which said flexible sheet material is a portion of a shoe upper and said layer of resinous material has a thickness receivable within a shoe and sufficient to provide the desired stiffening action when cured.

3. The process as defined in claim 2 in which said layer of resinous material is a pliable sheet of said polyurethane material having an outline shape corresponding to the area of the shoe part to be stiffened, said sheet is assembled as an inner layer of said shoe part, radiant heat is directed against exposed portions of the shoe part assembled with said pliable sheet before lasting the shoe upper and in which heat is applied to the upper after lasting to accelerate cure of said polyurethane material.

4. The process as defined in claim 3 in which said polyurethane material is the product of incomplete condensation and polymerization of an —NCO terminated prepolymer from condensation of mutually reactive materials including at least one compound having at least two active hydrogen groups and at least one compound having at least two isocyanate groups in proportion to provide at least about two equivalents of isocyanate for each equivalent of active hydrogen, additional polyisocyanate and a chain extender organic compound having at least two active hydrogens, the ratio of the sum of isocyanate groups from said prepolymer and isocyanate groups from said additional polyisocyanate to the active hydrogen of said chain extender being in excess of about 1:1.

5. The process as defined in claim 4 in which said mutually reactive materials include a more reactive and a less reactive organic compound each having at least two active hydrogen groups and said stage of incomplete polymerization corresponding to substantially complete reaction of said more reactive organic compound.

6. The process as defined in claim 5 in which said more reactive organic compound constitutes from about 5 mol. percent to about 50 mol. percent of the total of organic compound having at least two active hydrogen groups and in which the ratio of the sum of isocyanate groups available from said prepolymer and isocyanate groups from said additional polyisocyanate to the active hydrogen groups is about 1.1:1.

7. The process as defined in claim 6 in which said more reactive organic compound is an aromatic diamine and constitutes from about 10 mol. percent to about 30 mol. percent of the total of the organic compounds having at least two active hydrogen groups and in which the prepolymer is employed in amount providing from about 0.9 to about 0.2 equivalents of —NCO and said additional polyisocyanate provides from about 0.2 to 0.9 equivalents of —NCO.

8. The process as defined in claim 7 in which said prepolymer is the product of reacting a diisocyanate with an organic compound having at least two active hydrogen groups, said organic active hydrogen material comprising at least 15 percent of trifunctional active hydrogen compound, and said diisocyanate and said active hydrogen material being combined in relative quantities to give ratios of —NCO to OH in the range of from about 2:1 to about 9:2.

9. The process as defined in claim 7 in which said compound providing active hydrogen is the product of the condensation of ε-caprolactone with a low molecular weight diol or triol.